ELECTRICAL SWITCH

Original Filed Oct. 24, 1956 3 Sheets-Sheet 1

Alwin G. Steinmayer
Donald K. Jones
INVENTORS.

BY Arnold J. Ewison
Attorney

ELECTRICAL SWITCH

Original Filed Oct. 24, 1956 3 Sheets-Sheet 2

Alwin G. Steinmayer
Donald K. Jones
INVENTORS.

BY Gerald J. Ewian
Attorney

ELECTRICAL SWITCH

Original Filed Oct. 24, 1956 3 Sheets-Sheet 3

Alwin G. Steinmayer
Donald K. Jones
INVENTORS.

BY Arnold J. Ericson
Attorney

United States Patent Office

Re. 24,696
Reissued Sept. 8, 1959

24,696

ELECTRICAL SWITCH

Alwin G. Steinmayer, Milwaukee, Wis., and Donald K. Jones, Bellevue, Wash., assignors to McGraw-Edison Company, a corporation of Delaware Original No. 2,824,916, dated February 25, 1958, Serial No. 618,013, October 24, 1956. Application for reissue January 19, 1959, Serial No. 787,786

11 Claims. (Cl. 200—50)

Matter enclosed in heavy brackets [ ] appears in the original patent but forms no part of this reissue specification; matter printed in italics indicates the additions made by reissue.

The present invention relates generally to electrical switches, and more specifically to electrical switches of the by-pass, disconnect type which have particular application for manually by-passing or removing load from electrical equipment such as regulators of the induction type for regulating voltage or current, and of primary metering equipment, while routine maintenance operations are being performed.

Switches of the present type have been provided heretofore in the preferred unitary form and which have been adapted for operation to perform a number of distinct switching operations in succession during a single operation of the switch. Prior to the introduction of these unitary by-pass switch assemblies, it was necessary to use three single-pole, single-throw switches and associated shunting conductors to perform the function of by-passing and removing regulators from service without damage to various switch contacts. In addition, there was always the possibility of error on the part of a lineman to provide the proper switching sequence at a time when lines were extended and additional voltage regulation was required, or when regulators were to be isolated for maintenance, inspection and repair.

The present invention contemplates the provision of a by-pass, disconnect switch of unitary construction which is economical to manufacture of regularly obtained and stocked parts, and which switch requires a minimum amount of mounting space, and which switch further provides, in particular, the feature of an "over-and-under" arrangement of the various sequential operating switch blades.

Heretofore, it was the practice to provide a set of laterally spaced main switch blades mechanically connected with one another in insulated relationship to be jointly operated to open or closed position by means of an intermediately disposed operating eyelet. On engagement of an operating hook or switch stick to either open or close the main switch blades in accordance with this arrangement, it has often been found that one or both of the main switch blade members tends to freeze to its contact terminal after being exposed to the atmosphere for an extensive period. Thus, for instance, when the laterally spaced switch members are motivated towards open position, one of the members very often will be released from its contact prior to the other tending to introduce a twisting torque on the construction to thereby distort either or both of the blades away from their preferred aligning position relative to their respective contact terminal members.

It is therefore, a primary object of the present invention, to provide an over-and-under relative arrangement of switch blades, in which both blades are pivotally movable in a common plane for insuring correct alignment even under conditions which might tend to freeze one member with relation to its respective separable contact terminal.

The particular arrangement also provides a structure which is relatively simple to open and close, as all parts are in direct planar alignment with one another, requiring relatively less force during manual operation in either direction towards open or closed position.

It is among other objects of the present invention to provide a simplified and relatively economical structure taking less space for mounting and which contains readily accessible operating components for inspection and maintenance.

These and other objects of the present invention will become more apparent from the following drawings and description of an electrical switch wherein are embodied the principal features of the invention.

Referring now to the drawings.

The embodiment of Figs. 1–4, inclusive, relates to the present invention in its simplest form. That is, over an extensive period of operating service, it has been found that the principal need for regulator by-passing arrangements, which included both the former multi-switch arrangement and later introduced unitary structures, that for the most part, very little, and in fact, negligible exciting current ever required interruption during by-pass operation. For the most part, the majority of regulators used are of relatively low amperage and voltage rating. In addition, under any circumstance, the regulators is always to be set in the neutral position before by-pass switching operations are conducted.

Therefore, the present embodiment is designed to operate without need for any auxiliary current interrupting equipment, which might be necessary on relatively high voltage and high current rated switches used with the associated equipment. Such added features will be described in connection with another disclosed embodiment.

Figure 1:
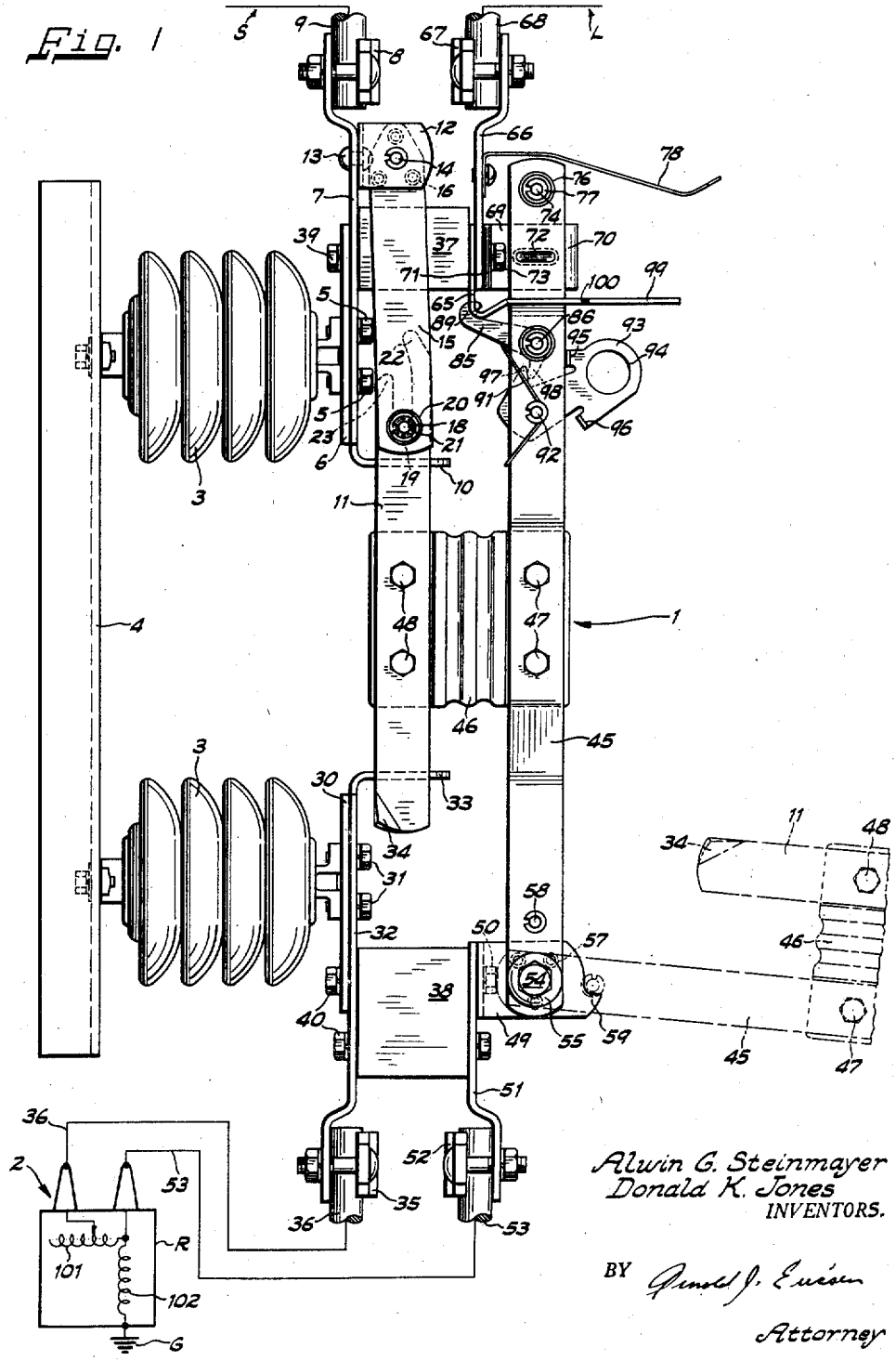
Fig. 1 is a side elevational view of the improved switch disclosed herein, and with a fragmentary portion shown in phantom by broken lines to indicate relative position of certain operating portions on movement of the switch to by-pass, open position.
Figure 2:
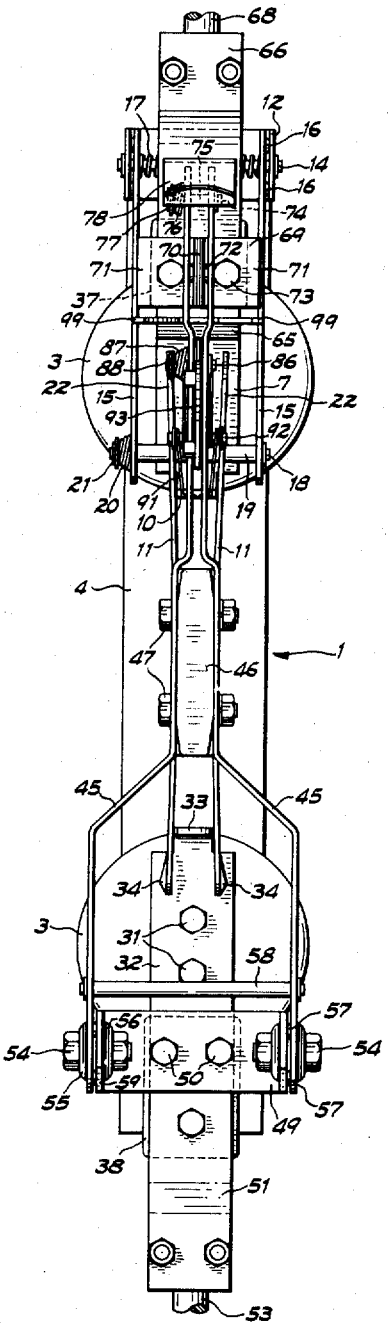
Fig. 2 is a front elevational view of the switch illustrated in Fig. 1.
Figure 3:
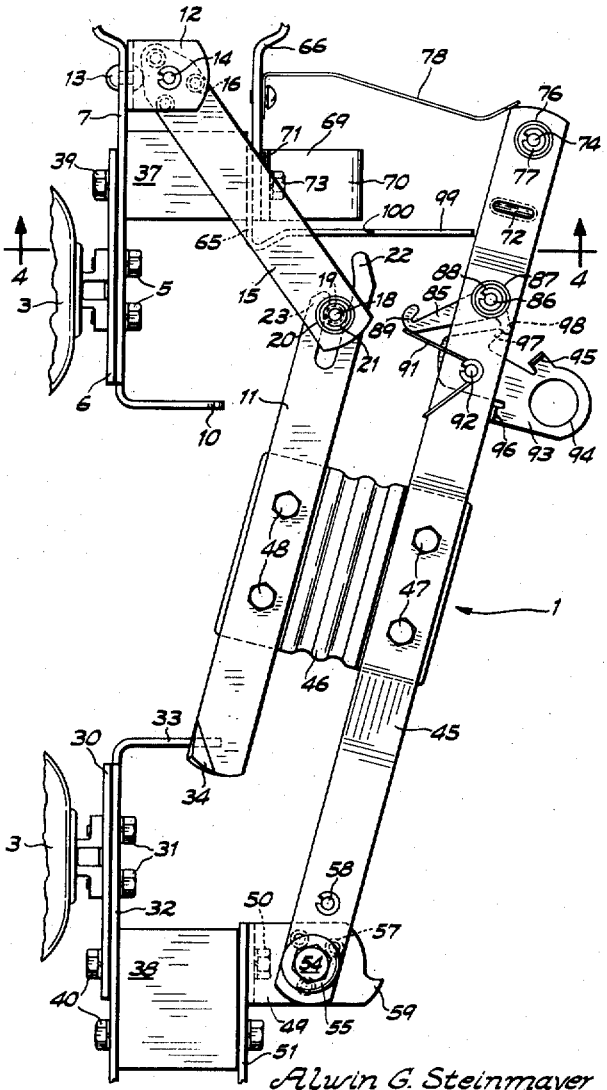
Fig. 3 is a fragmentary side elevational view illustrating the improved switch in partial by-pass, open position.

Referring now to Fig. 1, the improved by-pass, disconnect switch is designated generally by the reference numeral 1, with the regulator circuit being illustrated diagrammatically, and designated generally by the reference numeral 2. The preferred switch includes a pair of spaced insulator members 3 which are each fixed to a suitable base member 4. It is the general practice to mount the base member vertically relative to a supporting surface as shown, but it is within the province of the present invention to mount the structure in any suitable manner providing access to manipulation by means of a hook or switch stick (not shown).

As disclosed in Fig. 1, the upper contact assembly of the switch is secured to its respective insulator 3 by means of suitable fastening elements, such as bolts 5 engaging an adapter plate 6 to which is also fastened an adjacently positioned conducting terminal member 7. The terminal member 7 extends upwardly relative to the insulator 3, at one end thereof, to provide a means for receiving a suitable conductor clamp 8 engageable with a primary feeder conductor 9, a portion of which is shown diagrammatically and indicated by the reference symbol S denoting the source side of the feeder. The opposite end of the terminal member 7 is bent to provide a laterally extending angularly disposed guide portion 10, and which portion is undercut at opposed sides to provide a centrally located guide portion adapted to be seated between and slidably receive and maintain alignment of the parallel spaced apart secondary switch blades 11, which will hereinafter be more particularly described.

Intermediate the ends of the terminal member 7 is positioned a stationary hinge member 12, which is fastened to the terminal member by any suitable fastening device, such as by the rivets 13. The hinge member 12 is of a general U-shape and includes a transverse pivot pin 14 for pivotally supporting a pair of spaced apart, by-pass switch blades 15.

It is preferable to provide either the hinge member 12 or the by-pass switch blade 15, or both, with embossments projecting relative to one another, and designated here by the reference numeral 16 for insuring adequate high-pressure electrical contact between the members at all times. Adequate electrical contact is further insured by means of providing a compression coil spring circumjacent to the spring 17 (see Fig. 2), circumjacent to the pivot pin 14 with opposite ends abutting the inside surfaces of the switch blades 15 to urge them outwardly relative to one another and towards high-pressure electrical engagement with the respective leg portions of the hinge member 12.

The opposite ends of the by-pass switch blades 15 are mechanically and electrically joined by means of a conducting transverse pin 18 and conducting spacer sleeve 19, and are biased towards one another by means of the compression coil spring 20 circumjacent to the pin 18 and resting against a stop washer assembly 21 on the pin 18.

The opposed secondary switch blades 11 are each formed at their upper end, as viewed in Fig. 1, with bifurcated finger portions 22 and 23, and having the finger portion 22 extending beyond the terminus of the finger portion 23 for purposes hereinafter described. For the present, it will be sufficient to indicate that both portions 22 and 23 define an intermediate slot for slidably receiving the external surface of the conducting spacer sleeve 19 and to make electrical contact therewith.

It is also to be noted that the angularly disposed guide portion 10 of the terminal member 7 is preferably slightly tapered and of a sufficient width to provide relatively high pressure electrical contact with the interior surfaces of the secondary switch blades 11 when positioned in closed position as shown in Fig. 1.

The lower contact assembly, as viewed in Fig. 1, comprises an adapter plate 30 secured to the lower insulator 3 by fastening elements, such as the bolts 31, which also serve to securely fasten the lower conducting terminal member 32 thereto. The member 32 is formed in substantially the same manner as the terminal member 7, previously described. That is, one end portion 33 is bent angularly upwardly to electrically engage the lower extending end of the secondary switch blades 11. The extremity of each switch blade 11 is preferably bent angularly outwardly to provide the camming or aligning portions 34, which act as a guide means for proper alignment of the opposed switch blades 11 with the electrically contacting portion 33 of the terminal member 32 during movement of the blades 11 to closed position.

The terminal member 32 extends downwardly as shown in Fig. 1 to provide a means for receiving the conductor clamp 35 engageable with the conductor 36 leading to the regulator circuit 2, which will be described hereinbelow.

Secured to both the terminal members 7 and 32, respectively are insulating upper and lower spacer members 37 and 38, which are preferably of ceramic material, but may be manufactured of any suitable insulating material. The spacer members are secured to the respective terminal members by suitable fastening elements 39 and 40. The spacer blocks or members 37 and 38 are provided to support the main switch blade structure and its cooperating terminals in normal insulating spaced relationship relative to the circuit established through the normally electrically connected terminal members 7 and 32 and their bridging auxiliary switch blade 11.

The main switch blades are denoted by the reference character 45 and are positioned in parallel spaced apart relationship, being secured at opposite sides of a skirted insulating spacer 46, by means of transverse bolt and nut assemblies 47. The spacer 46 extends laterally to engage both secondary switch blades 11 at either side thereof and is secured thereto by means of the bolt and nut assemblies 48. The spacer 46, is preferably of a ceramic material and acts to stationarily secure both the blades 45 and 11 in stationary relative relationship for concurrent movement, as will hereinafter be described.

It is to be noted that the present invention embodies opposed parallel switch blade construction throughout in order to take advantage of the magnetic effects taking place under current carrying conditions, which tend to draw the blades towards one another, and thus insure positive electrical engagement with their respective stationary contacts.

The main switch blades 45 are each hinged at the lower end, as viewed in Fig. 1, and are pivotable on respective projecting leg portions of the U-shaped hinge member 49, which hinge member is secured to the lower spacer member or block 38 by means of the bolts 50. A conducting terminal member 51 is also fastened to the spacer block 38 intermediate the hinge 49 and the block, and extending endwise to provide a means for receiving the conductor clamp 52. The clamp 52 is arranged to electrically and mechanically engage the conductor 53 leading to the regulator circuit 2, which will hereinafter be described.

The main switch blades 45 are pivotably fastened to the projecting leg portions of the conducting hinge member 49 by means of transverse bolt and nut assemblies 54 including cup-like spring washers 55 and 56 at opposed sides of the hinge member 49 and the respective blade 45. The spring washers 55 and 56 respectively urge the members 45 and 49 towards one another to provide high pressure electrical contact therebetween with the aid of the laterally protruding embossments 57 on the switch blades. Although the embossments 57 are shown on the blades, it will be understood that they could be either on the blades and on the hinge member, or on both members, if so desired (not shown).

It is also preferable to provide a transverse stop pin 58 which is engageable with a shoulder 59 provided on the laterally extending leg portions of the hinge member 49 to act as a limiting means for restraining outward movement of the movable switch blade members 45 and 11 beyond the position shown in the dot-dash lines of Fig. 1.

Figure 4:
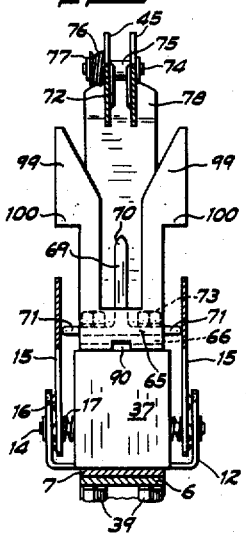
Fig. 4 is a sectional view taken along lines 4—4 of Fig. 3.

At the upper end of the switch 1, is provided a stationary terminal assembly secured to the spacer block 37. The assembly comprises a conducting L-shaped blade guide 65, the particular configuration of which is shown especially in Fig. 4. Resting directly adjacent the blade guide is a terminal member 66 extending upwardly to receive the conductor clamp 67. The clamp 67 is engageable with the conductor 68 supplying the load side L of the primary feeder. Also secured to the spacer block 37 is a stationary contact block 69, which is conducting and electrically engaging the terminal member 66. The contact block 69 is preferably T-shaped as shown in Fig. 4 and comprises an intermediate, preferably center-located, stud portion 70 and oppositely extending contact portions 71 slidably electrically engageable with the interior surfaces of the by-pass switch blades 15, as will hereinafter be described. The stud portion 70 is engageable with the inwardly extending embossments 72 of the main switch blades 45 for high pressure electrical contact therewith.

The stationary terminal assembly comprising the members 65, 66 and 69 is secured to the insulating spacer block by means of bolts 73.

The upper extremities of the main switch blades 45 are joined by means of a transverse pin 74, and are held in spaced-apart relationship by means of a spacer sleeve 75. Both blades 45 are biased towards one another by means of the compression spring 76 engaging one blade and a stop washer assembly 77. A resilient conducting shunt member 78 of stamped metal is preferably secured to the terminal member 66 and extends outwardly relative thereto. As will hereinafter be described, the shunt member 78 is electrically engageable with the extremity of the main switch blade 45 during its outward movement, and is of such length as to insure continued electrical contact with the main switch blade until the by-pass switch blades 15 are in secure electrical engagement with the outwardly projecting portions 73 of the conducting contact block 69.

The shunt member 78 is bent outwardly at its free extremity to freely receive the switch blade on closing operation as will hereinafter be discussed.

Mounted at the upper end of the switch blade is a latching device comprising a latch 85 which is pivotally mounted between the opposed switch blades 45 by means of the pivot pin 86, which pivot pin is further held in place by means of the compression spring 87 and stop washer assembly 88. The latch is provided at its outward extremity with a latching detent portion 89 engageable with a slot 90 (see Fig. 4) at the bottom of the blade guide 65, and as shown in latched position in Fig. 1. The latch 85 has associated therewith a U-shaped torsion spring 91 which is looped intermediate its ends around the outwardly extending extremities of a transverse pivot pin 92 positioned in opposed apertures in spaced-apart main switch blades 45. The bale portion of the U-shaped torsion spring 91 engages the latch 85 to urge it in a clockwise direction, as shown in Fig. 1, towards latching position. The ends of the spring 91 are anchored to each of the main switch blades by being bent inwardly relative thereto. The pivot pin 92 also serves to support the latch operating member 93 which member includes an operating eyelet 94 engageable with a hook or switch stick (not shown) for manual operation. Juxtaposed, angularly bent, stop portions 95 and 96 on the latch operating member 93 are engageable with one of the switch blades 45 to control the rotative motion of the member. A shoulder portion 97 is slidably engageable with a protuberance 98 extending from the latch 85 to provide a cam means for actuating the latch towards counter-clockwise direction against the biasing effect of the spring 91. Thus, a downward pull on the eyelet 94 of the latch operating device 93 will cause the shoulder 97 to move the protuberance 98 on the latch member to cause the latch member to be released at its detent portion 89 from the slot 90 in the blade guide 65.

As shown in Fig. 4, the blade guide 65 is preferably bifurcated to provide two laterally extending legs 99 for receiving the main switch blades 45 therebetween and for guiding them towards electrical engagement with the stud portion 70 of the contact block 69 during closing movement thereof. The inner surfaces of the legs are preferably tapered as shown to insure guiding alignment. A shoulder 100 is provided on the outer surface of each of the opposed leg portions 99 to act as a limiting outer stop on engagement with the opposed by-pass switch blades 15 when the said blades are moved to electrical engagement with the contact block 69. The shoulders 100 prevent the blades 15 from moving past a predetermined point in order that the extended finger 22 of the secondary switch blade 11 will always be insured of engaging the sleeve 19 of the pin 18 on the by-pass switch blades 15 as will hereinafter be described.

The regulator circuit, for which the improved switch 1 is best suited as a by-pass means, comprises an induction type regulator R including a series winding 101 and a primary winding 102. The primary winding may be connected, as shown, at one end with ground G. As shown, the series winding is provided with some means for varying the voltage or current as desired. The primary winding 102 is connected through a bushing to the conductor 53, which in turn is engageable with the conducting terminal 51 of the main switch blade portion of the improved by-pass, disconnect switch 1. The series winding is electrically connected to the terminal 32 by means of the conductor 36 for connection with the source side S of the primary feeder conductor 9. The circuit is completed through the secondary switch blade 11 and the by-pass switch blade 15 as shown in normally closed circuit position in Fig. 1. The primary winding 102 makes circuit connection through the terminal member 51 to the main switch blade 45, the contact block 69, and the terminal 66, to the load side of the primary conductor 68.

In describing the operation of the improved switch of the embodiment disclosed in Figs. 1–4, inclusive, it will be assumed that the switch is in the closed switch position as shown in Fig. 1. As described above, the electrical energy is conducted from a source of energy S to the conductor 9 through the circuit established by the normal electrical engagement of blades 11 and 15, and from the terminal portion 10 to the blades 11, to the conductor 36 and from this conductor to the series winding 101 of the regulator R, if such regulator is of the type to be associated with the switch 1. The other circuit to the main feeder is established from the primary winding 102 of the regulator R to conductor 53, and from this conductor to the feeder conductor 68 through the main switch blade circuit 45.

Assuming that it is desired to take the equipment with which the switch is associated out of service for inspection or repairs, an operator will engage the eyelet 94 of the latch operating member 93 with a conventional hook or switch stick (not shown). The eyelet is pulled downwardly and outwardly, with respect to the illustration of Fig. 1, to engage the shoulder 97 on the member 93 with the protuberance of the latch 85 to cause the detent 89 to be released from the latching slot 90 of the blade guide 65. Continued pull on the eyelet 94 in this direction will move the upper portions of both the switch blades 11 and 45 outwardly with respect to their normally electrically engaged components. The insulating spacer 46, which is secured to both switch blades 11 and 45, will permit concurrent movement of these blades. That is, as the main switch blades 45 are removed from the stud 70 of contact block 69, the auxiliary blade 11 is concurrently separated from the portions 10 and 33 of the terminal members 7 and 32, respectively, and the conducting sleeve 19 of the by-pass blade 15 will be slidably removed from the slot defined by the fingers 22 and 23 of the blade 11. Continued movement of the auxiliary blades 11 will urge the by-pass blades 15 into positive electrical engagement between the interior surfaces of these blades with their respective contacting portions 71 of the contact block 69. This is more particularly indicated in the view of Fig. 3, wherein the main switch blades are shown in nearly open position, but still in contact with the shunt member 78. Thus, electrical engagement between the upper and lower terminals is assured by contact of the main switch blades 45 with the shunt member 78 until such time that the by-pass blades 15 are in secure electrical engagement with the contact portions 71 to establish the by-pass circuit between the terminal member 7 and the terminal member 66. Thus, continuity of service between the source side S and the load side L is assured without interruption as the switch 1 is moved to the open position for removal of the regulator R from the circuit for maintenance or inspection. Continued outward and downward movement of the switch past the position shown in Fig. 3 will permit complete release of the sleeve 19 of the by-pass blades 45 from the slot of the auxiliary switch blade 11 and complete separation of the main switch blades 45 from their stationary terminal portions, including the shunt member 78.

The entire regulator circuit will be disconnected on opening of the switch blades 45 and 11, as may be seen in the dot-dash portions of Fig. 1 with the main switch blades 45 and the auxiliary switch blades 11 entirely separated from the upper terminal members and with the blade 11 completely severed from electrical connection with the portion 33 of the lower terminal member 32.

As has been heretofore stated, in most installations where regulator by-pass switches are installed, it has been found that there is very little or negligible exciting current available that might cause any arcing on interruption of the blades from the upper stationary contact assemblies. This is especially true, as it is conventional, if not mandatory, practice to set the regulator in neutral position prior to opening of the by-pass, disconnect switch.

However, if the switches are to be used on the equipment that is likely to have available exciting current of sufficient magnitude to cause arcing, the present invention contemplates the provision of the embodiment of Figs. 5–7, as will hereinafter be described.

To replace the equipment with which the switch is associated in service, the switch blades are moved upwardly into contact with their respective stationary terminal assemblies. That is, the auxiliary switch blade 11 will again electrically engage the sleeve 19 of the by-pass switch blades 15 by means of the endwise extending contact finger 23, which is slidably urged against the sleeve to withdraw the blades from electrical engagement with the contact portion 71 of the contact block 69. Continued upward movement of a hook stick engaging the eyelet 94 will provide the normally circuit closed engagement between the blades 15 and the blades 11, along with positive bridging engagement between the auxiliary blades and the stationary terminal portions 10 and 33.

Concurrent with the movement of the auxiliary switch blades 11 to closed position will be the movement of the main switch blades 45 into engagement with the contact block stud 70 to provide a closed electrical circuit between the conductors 68 and 53. Movement of the switch blade is continued in an upward direction, as viewed in Fig. 1, until the latch detent portion 89 engages the slot 90 of the blade guide 65. It will be apparent that contact of the main switch blade 45 with the upwardly bent extremity of the shunt 78 will force the shunt member outwardly and against the end of the blades to maintain electrical engagement between the members during closing operation of the switch 1.

Figure 5:
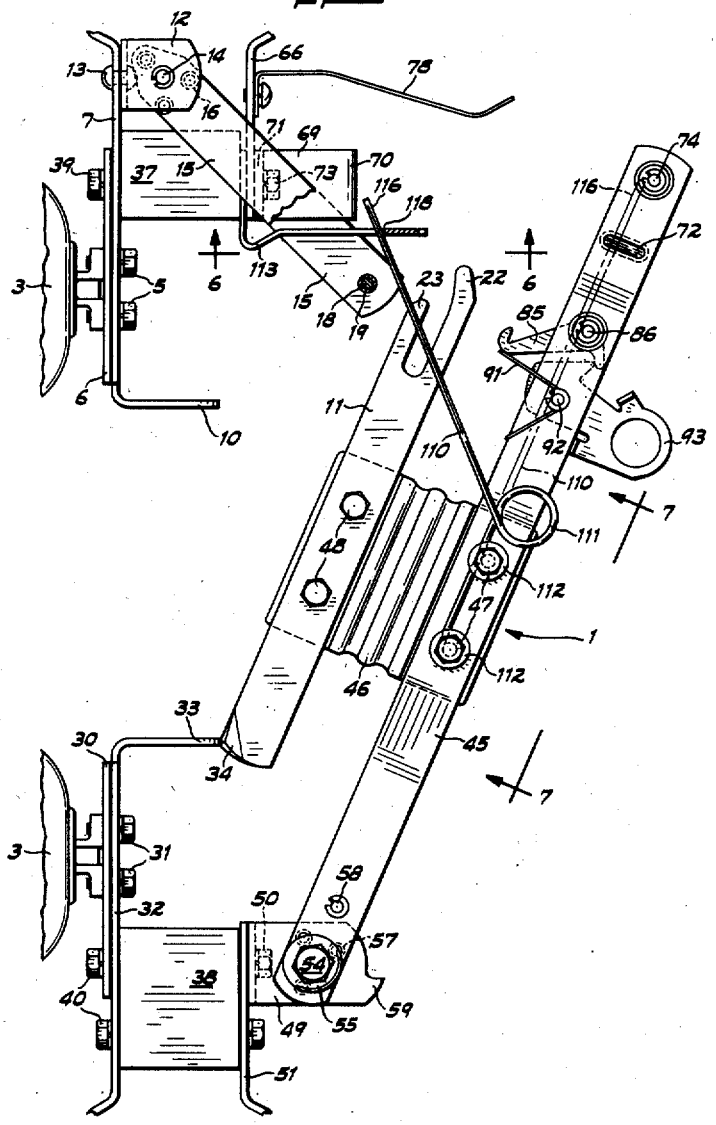
Fig. 5 is a fragmentary side elevational view of another embodiment of the improved switch.
Figure 6:
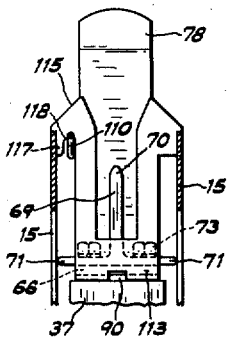
Fig. 6 is a sectional view taken along lines 6—6 of Fig. 5.
Figure 7:
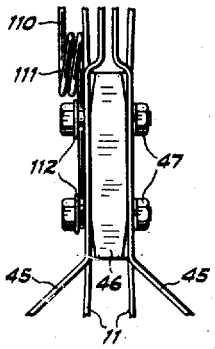
Fig. 7 is a fragmentary sectional view taken on lines 7—7 of Fig. 5 to indicate relative width of the exciting current interrupting member.

In Figs. 5–7, inclusive, there is illustrated another embodiment of the present invention. In all of the several figures disclosing both embodiments, it will be understood that like reference numerals refer to like parts.

The present embodiment provides a relatively simple arc-interrupting device for by-pass, disconnect switches adapted for use on regulator circuits or the like where there is exciting current of sufficient magnitude to create arcing between contacts. Heretofore, there have been rather elaborate auxiliary circuits established for interruption of exciting currents. Such devices have included tubes with elongated chambers lined with arc-extinguishing material, such as horn fiber or the like, and containing within the chamber separable arcing contacts. With such elaborate devices it was necessary to provide additional auxiliary contacts externally of the tube insuring a proper interrupting sequence of the arcing contacts subsequent to opening of the main switch blades.

The present invention contemplates the addition of a resilient arc-interrupting member adapted to provide a "buggy-whip" action for quick interruption of any arcs created on separation of the normally current carrying blade members. The interrupting circuit is readily added to conventional by-pass switches, as described in connection with the first embodiment, without requiring major changes in any of the heretofore described components, and with the simple insertion of a resilient member in physical and electrical contact with the main switch blades for concurrent movement with the said blades.

Referring now to Fig. 5, it will be apparent that the general construction of the by-pass switch is as previously described, except for the addition of a resilient arcing member in the form of the spring contact 110. The contact is preferably coiled at the portion 111 intermediate its ends. For convenience, the contact is coiled with a number of juxtaposed convolutions as shown in Fig. 7 in order to extend the member laterally outwardly of the main switch blades 45 in order to provide sufficient clearance between parts and also to adapt the member for operation in the structure without requiring elaborate modification of the components previously described in connection with the embodiment of Figs. 1–4. The arcing contact 110 is fastened at one end to the main switch blades by insertion between one of the blades 45 and the mounting bolts 47. Added physical and electrical contact surface is provided by the washers 112.

As specifically shown in Fig. 6, the blade guide 113 has been somewhat modified from the previously described and referred to by the reference numeral 65 in the first embodiment. That is, the upstanding legs of the blade guide have been provided with external tapered surfaces as well as internal tapered surfaces. It will be recalled, that the inner tapered surfaces on the guide described in connection with the first embodiment were for guiding the main switch blades 45 into correct alignment for engagement with the contact stud 70. The inner tapered surfaces of the present embodiment are also provided for the same reason. However, the outer surface 115 has been cut at a preferred angle to provide a camming surface for guiding engagement with the arcing end 116 of the contact 110 during closing movement of the switch blades. Thus, the surface 115 on the blade guide will also act to define a projecting shoulder portion 117 preferably terminating in a slot 118 for normally receiving the spring contact 110.

In operation, the present embodiment functions substantially identical to the first-described embodiment. In the present case, the main switch blades 45 and auxiliary switch blades 11 are opened by means of engagement of a conventional hook stick with the eyelet 94 and withdrawing the blades outwardly and downwardly relative to the disclosure of Fig. 5. Movement of the auxiliary blades 11 forces the by-pass switch blades 15 into physical and electrical engagement with the contact surfaces 71 on the contact blocks 69. During this time, the main switch blade 45 makes electrical contact with the shunt member 78 for a period of time of sufficient duration to insure secure circuit connections between the by-pass switch blades 15 at the contact block 69.

However, in the present description, it is assumed that the regulator circuit (not herein shown) is of sufficient size to provide exciting current of a magnitude that might cause arcing between the various members on separation. Thus, it will be apparent from Fig. 5 that the free end 116 of the arcing contact 110 will remain in slidable electrical connection with the blade guide 113 until the members 45 and 11 have been moved outwardly and downwardly a sufficient distance to clear their respective normally engageable members. Thus, the free end 116 of the contact 110 is the last member to leave the upper stationary contact assembly comprising among other components, the conducting blade guide 113. Because of its resiliency, the contact will leave the blade guide with a snap-action to provide a "buggy-whip" effect for interrupting any arcs that might be created between the members. After interruption, it will be apparent that the arcing contact 110 will take its normal position shown in the dot-dash lines of Fig. 6.

It will be apparent that on closing operation of the main switch components, the various members will operate as described in the first embodiment to engage the blades 11 and 15 for removal of the by-pass switch blades 15 from the upper contact assembly, in addition to providing circuit closure between the main switch blades 45 and the contact block stud 70. As the main switch blades 45 are brought into alignment with the blade guide 113, the free end 116 of the contact 110 will slidably engage the outer tapered surface 115 of the blade guide, and will be forced outwardly around the shoulder 117 for snap-action into its normal resting position as shown in Fig. 6.

It will be apparent that the number of convolutions of the coiled portion 111 of the contact 110 may be predetermined to provide sufficient lateral dimensions relative to the main switch blades 45 for clearance of all parts and proper sliding contact with the surface 115 of the member 113 during closing operation.

It will be apparent that, although both embodiments have been described to provide constructions wherein movement of the blades 11 actuate the by-pass blades 15 into contact with the block 69, it is conceivable that the present arrangement may be adapted to a structure wherein the blades 45 may actuate the movement of a set of by-pass blades (not shown) into and out of engagement with its respective stationary contact without departing from the scope of the present invention.

The present invention provides a relatively simplified switch construction of easily manufactured and assembled low-cost components designed to operate into and out of circuit closed position with a minimum of manual effort and with the assurance that all parts will be in relative alignment during operating movement substantially eliminating any tendency for parts to twist or rake because of uneven pressures between contacting portions of relative moving members. It will be apparent that the positioning of all members designed for concurrent movement in substantially a common plane overcomes the various problems inherent in constructions having blades arranged in side-by-side or other like arrangement.

Having thus described the present invention, what is claimed and desired to secure by Letters Patent, is as follows:

1. A disconnect switch comprising a first and a second stationary contact in spaced insulating relationship and lying in a common plane, first and second switch blade members insulatingly spaced from one another *in over under relationship* and each supported for concurrent movement in said common plane into and out of electrical contact with a respective one of said first and second stationary contacts, a by-pass switch member supported for movement into and out of bridging electrical engagement with said spaced stationary contacts to provide a means of by-passing electrical energy from one to the other of said contacts, said switch blades being operatively associated with said by-pass member to actuate said member towards movement into and out of bridging electrical engagement with said stationary contacts during respective alternative operation of said blades towards disengagement and engagement with the said respective stationary contacts.

2. A disconnect switch comprising a first and a second stationary contact in spaced insulating relationship and lying in a common plane, first and second switch blade members insulatingly spaced from one another *in over under relationship* and each supported for concurrent movement in said common plane into and out of electrical contact with a respective one of said first and second stationary contacts, a by-pass switch member in electrical engagement with and pivotally supported on said first stationary contact for rotative movement into and out of bridging electrical engagement with said second stationary contact to provide a means of by-passing electrical energy from one to the other of said contacts, said switch blades being operatively associated with said by-pass member to actuate said member towards movement into and out of bridging electrical engagement with said stationary contacts during respective alternative operation of said blades towards disengagement and engagement with the said respective stationary contacts.

3. A disconnect switch comprising a first and a second stationary contact in spaced insulating relationship and lying in a common plane, first and second switch blade members insulatingly spaced from one another *in over under relationship* and each supported for concurrent movement in said common plane into and out of electrical contact with a respective one of said first and second stationary contacts, a by-pass switch member in electrical engagement with and pivotally supported on said first stationary contact for rotative movement into and out of bridging electrical engagement with said second stationary contact to provide a means of by-passing electrical energy from one to the other of said contacts, said first switch blades including means for releasably alternative engagement and disengagement with said by-pass member to actuate said member towards rotative movement into and out of bridging electrical engagement with said second stationary contact during respective alternative operation of said first blade towards disengagement and engagement with said first stationary contact.

4. A disconnect switch comprising a first and a second stationary contact in spaced insulating relationship and lying in a common plane, first and second switch blade members insulatingly spaced from one another and each supported for concurrent movement in said common plane into and out of electrical contact with a respective one of said first and second stationary contacts, a by-pass switch member in electrical engagement with and pivotally supported on said first stationary contact for rotative movement into and out of bridging electrical engagement with said second stationary contact to provide a means of by-passing electrical energy from one to the other of said contacts, said by-pass switch member including at its free end a laterally extending pin-like element, said first switch blade including spaced integral finger portions extending from one end and alternatively graspingly engageable with the said pin-like element of said by-pass member to actuate said member towards rotative movement into and out of bridging electrical engagement with said second stationary contact during respective alternative operation of said first blade towards disengagement and engagement with said first stationary contact.

5. A disconnect switch comprising a first and a second stationary contact in spaced insulating relationship and lying in a common plane, first and second switch blade members insulatingly spaced from one another and each supported for concurrent movement in said common plane into and out of electrical contact with a respective one of said first and second stationary contacts, a by-pass switch member supported for movement into and out of bridging electrical engagement with said spaced stationary contacts to provide a means of by-passing electrical energy from one to the other of said contacts, said first switch blade being operatively associated with said by-pass member to actuate said member towards movement into and out of bridging electrical engagement with said stationary contacts during respective alternative operation of said first blade towards disengagement and engagement with the said first stationary contact, and an auxiliary contact shunting member laterally extending from said second stationary contact and arranged for sliding electrical engagement with said second switch blade member during opening operation thereof and being further arranged to maintain said electrical engagement until said by-pass switch member is in positive bridging electrical engagement with said spaced stationary contacts.

6. A disconnect switch comprising a first and a second stationary contact in spaced insulating relationship and lying in a common plane, first and second switch blade members insulatingly spaced from one another *in over under relationship* and each supported for concurrent movement in said common plane into and out of electrical contact with a respective one of said first and second stationary contacts, a by-pass switch member supported for movement into and out of bridging electrical engagement with said spaced stationary contacts to provide a means of by-passing electrical energy from one to the other of said contacts, said switch blades being operatively associated with said by-pass member to actuate said member towards movement into and out of bridging electrical engagement with said stationary contacts during respective alternative operation of said blades towards disengagement and engagement with the said respective stationary contacts, and auxiliary arc interrupting means associated with one of said switch blade members to provide continued electrical contact between said one switch blade and its respective stationary contact during disengaging operation of said switch blades for a predetermined period of time until both of said switch blades have been fully disengaged from their respective stationary contacts.

7. A disconnect switch comprising a first and a second stationary contact in spaced insulating relationship and lying in a common plane, first and second switch blade members insulatingly spaced from one another and each supported for concurrent movement in said common plane into and out of electrical contact with a respective one of said first and second stationary contacts, a by-pass switch member supported for movement into and out of bridging electrical engagement with said spaced stationary contacts to provide a means of by-passing electrical energy from one to the other of said contacts, said switch blades being operatively associated with said by-pass member to actuate said member towards movement into and out of bridging electrical engagement with said stationary contacts during respective alternative operation of said blades towards disengagement and engagement with the said respective stationary contacts, and an auxiliary arc interrupting means comprising an elongated resilient contact spring secured at one end to said first switch blade and arranged for sliding electrical engagement with said first stationary contact member, said spring being of a length sufficient to maintain said electrical contact during disengaging operation of said switch blades until said blades have been fully disengaged from their respective stationary contacts.

8. A disconnect switch comprising a first and a second stationary contact in spaced insulating relationship and lying in a common plane, first and second switch blade members insulatingly spaced from one another *in over under relationship* and each supported for concurrent movement in said common plane into and out of electrical contact with a respective one of said first and second stationary contacts, a by-pass switch member in electrical engagement with and pivotally supported on said first stationary contact for rotative movement into and out of bridging electrical engagement with said second stationary contact to provide a means of by-passing electrical energy from one to the other of said contacts, said switch blades being operatively associated with said by-pass member to actuate said member towards movement into and out of bridging electrical engagement with said stationary contacts during respective alternative operation of said blades towards disengagement and engagement with the said respective stationary contacts, and auxiliary arc interrupting means associated with one of said switch blade members to provide continued electrical contact between said one switch blade and its respective stationary contact during disengaging operation of said switch blades for a predetermined period of time until both of said switch blades have been fully disengaged from their respective stationary contacts.

9. A disconnect switch comprising a first and a second stationary contact in spaced insulating relationship and lying in a common plane, first and second switch blade members insulatingly spaced from one another and each supported for concurrent movement in said common plane into and out of electrical contact with a respective one of said first and second stationary contacts, a by-pass switch member in electrical engagement with and pivotally supported on said first stationary contact for rotative movement into and out of bridging electrical engagement with said second stationary contact to provide a means of by-passing electrical energy from one to the other of said contacts, said switch blades being operatively associated with said by-pass member to actuate said member towards movement into and out of bridging electrical engagement with said stationary contacts during respective alternative operation of said blades towards disengagement and engagement with the said respective stationary contacts, and an auxiliary arc interrupting means comprising an elongated resilient contact spring secured at one end to said first switch blade and arranged for sliding electrical engagement with said first stationary contact member, said spring being of a length sufficient to maintain said electrical contact during disengaging operation of said switch blades until said blades have been fully disengaged from their respective stationary contacts.

10. A disconnect switch comprising a first and a second stationary contact in spaced insulating relationship and lying in a common plane, first and second switch blade members insulatingly spaced from one another and each supported for concurrent movement in said common plane into and out of electrical contact with a respective one of said first and second stationary contacts, a by-pass switch member in electrical engagement with and pivotally supported on said first stationary contact for rotative movement into and out of bridging electrical engagement with said second stationary contact to provide a means of by-passing electrical energy from one to the other of said contacts, said by-pass switch member including at its free end a laterally extending pin-like element, said first switch blade including spaced integral finger portions extending from one end and alternatively graspingly engageable with the said pin-like element of said by-pass member to actuate said member towards rotative movement into and out of bridging electrical engagement with said second stationary contact during respective alternative operation of said first blade towards disengagement and engagement with said first stationary contact, and auxiliary arc interrupting means associated with one of said switch blade members to provide continued electrical contact between said one switch blade and its respective stationary contact during disengaging operation of said switch blades for a predetermined period of time until both of said switch blades have been fully disengaged from their respective stationary contacts.

*11. A disconnect switch comprising a first and a second stationary contact in vertically offset spaced insulating relationship and lying in a common plane, first and second switch blade means each of which are comprised of a pair of electrically connected horizontally spaced elongated members mechanically connected to move as a unit, said first and second switch blade means being insulatingly vertically spaced from one another in over under relationship and each supported for concurrent movement in said common plane into and out of elec-*

*trical contact with a respective one of said first and second stationary contacts, a by-pass switch member supported for movement into and out of bridging electrical engagement with said vertically offset spaced stationary contacts to provide a means of by-passing electrical energy from one to the other of said contacts, said switch blade means being operatively associated with said by-pass member to actuate said member towards movement into and out of bridging electrical engagement with said stationary contacts during respective alternative operation of said switch blade means towards disengagement and engagement with the said respective stationary contacts, and an auxiliary arc interrupting means comprising an*

*elongated resilient contact spring secured at one end to said first switch blade means and generally horizontally aligned therewith for sliding electrical engagement with said first stationary contact member, said spring being of a length sufficient to maintain said electrical contact during disengaging operation of said switch blade means until said blade means have been fully disengaged from their respective stationary contacts.*

References Cited in the file of this patent or the original patent

| | | |
|---|---|---|
| 1,747,035 | Steinmayer | Feb. 11, 1930 |
| 2,239,224 | Goldner | Apr. 22, 1941 |